United States Patent
Basha

(10) Patent No.: US 10,316,535 B2
(45) Date of Patent: Jun. 11, 2019

(54) PARKING APPARATUS

(71) Applicant: Dr. Ing. h.c. F. Porsche Aktiengesellschaft, Stuttgart (DE)

(72) Inventor: Bekim Basha, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/042,198

(22) Filed: Jul. 23, 2018

(65) Prior Publication Data

US 2019/0063097 A1    Feb. 28, 2019

(30) Foreign Application Priority Data

Aug. 30, 2017   (DE) .................. 10 2017 119 929

(51) Int. Cl.
| | | |
|---|---|---|
| *E04H 6/06* | (2006.01) | |
| *E04H 6/42* | (2006.01) | |
| *E04H 6/18* | (2006.01) | |

(52) U.S. Cl.
CPC ............. *E04H 6/06* (2013.01); *E04H 6/422* (2013.01); *E04H 6/18* (2013.01)

(58) Field of Classification Search
CPC .. E04H 6/06; E04H 6/18; E04H 6/422; E04H 6/12
USPC .................................. 414/228, 233, 234
See application file for complete search history.

(56) References Cited

U.S. PATENT DOCUMENTS

| | | | | |
|---|---|---|---|---|
| 1,987,376 A | * | 1/1935 | Stearns | E04H 6/065 414/230 |
| 2,639,046 A | * | 5/1953 | Tatosian | E04H 6/06 254/91 |
| 2,660,320 A | * | 11/1953 | Wullschleger | E04H 6/06 187/207 |
| 2,858,032 A | * | 10/1958 | Morley | B66F 7/0641 414/239 |
| 3,051,340 A | * | 8/1962 | Ely | B60P 3/07 187/211 |
| 3,941,257 A | * | 3/1976 | Matsuura | E04H 6/065 414/233 |

(Continued)

FOREIGN PATENT DOCUMENTS

| | | |
|---|---|---|
| DE | 8603017 U1 | 3/1986 |
| DE | 9200871 U1 | 7/1992 |

(Continued)

OTHER PUBLICATIONS

German Examination Report for German Application No. 10 2017 119 929.2, dated May 15, 2018, with partial English translation—6 pages.

*Primary Examiner* — Mark C Hageman
(74) *Attorney, Agent, or Firm* — RatnerPrestia

(57) ABSTRACT

A parking apparatus having at least two parking areas, on each of which a motor vehicle can be parked. The parking apparatus includes at least one movable parking area which is movable relative to at least one fixed parking area. In order to simplify the charging of electrically operable motor vehicles, the parking apparatus is combined with a charging apparatus for charging electrical energy accumulators of electrically operable motor vehicles. The charging apparatus is simultaneously connectable in terms of charging to electrically operable motor vehicles on both parking areas.

8 Claims, 2 Drawing Sheets

(56) References Cited

U.S. PATENT DOCUMENTS

| | | | | |
|---|---|---|---|---|
| 5,141,371 A * | 8/1992 | Pish | ................ | B64F 1/222 |
| | | | | 244/114 R |
| 5,336,031 A * | 8/1994 | Golan | ................ | B60P 3/08 |
| | | | | 254/88 |
| 5,839,871 A * | 11/1998 | Namgung | ................ | E04H 6/06 |
| | | | | 414/228 |
| 6,607,343 B1 * | 8/2003 | Amgar | ................ | E04H 6/06 |
| | | | | 414/228 |
| 8,863,911 B2 | 10/2014 | Ecochard | | |
| 2011/0074351 A1 * | 3/2011 | Bianco | ................ | B60L 11/1816 |
| | | | | 320/109 |
| 2011/0113609 A1 | 5/2011 | Berdlelle-Hilge et al. | | |
| 2014/0321952 A1 * | 10/2014 | Sala Branchadell | ................ | |
| | | | | B60L 11/1824 |
| | | | | 414/234 |
| 2018/0118539 A1 * | 5/2018 | Kritzer | ................ | B66F 7/065 |

FOREIGN PATENT DOCUMENTS

| | | |
|---|---|---|
| DE | 3603573 C2 | 4/1995 |
| DE | 29511941 U1 | 11/1995 |
| DE | 29604798 U1 | 11/1996 |
| DE | 102009053050 A1 | 5/2011 |
| DE | 102014112799 A1 | 3/2016 |
| DE | 102016110634 A1 | 12/2016 |

\* cited by examiner

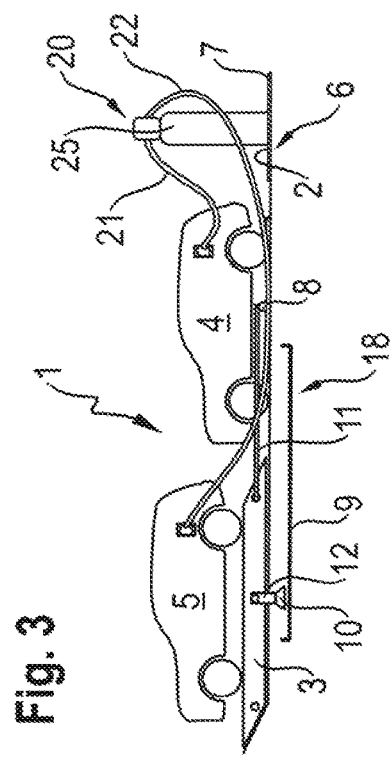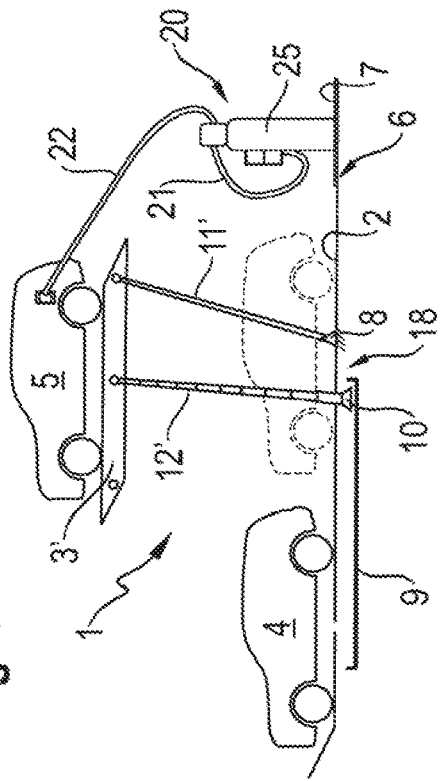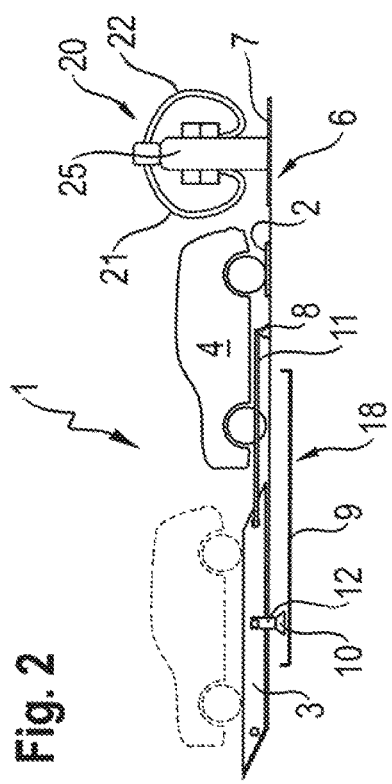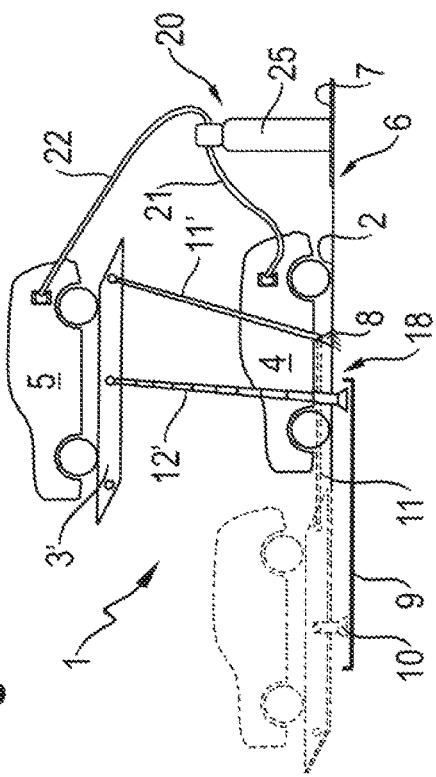

PARKING APPARATUS

CROSS-REFERENCE TO RELATED APPLICATION

This application claims priority to German Patent Application No. DE 10 2017 119 929.2, filed Aug. 30, 2017, which is incorporated by reference herein in its entirety.

FIELD OF THE INVENTION

The invention relates to a parking apparatus having at least two parking areas, on each of which a motor vehicle can be parked, wherein the parking apparatus comprises at least one movable parking area which is movable relative to at least one fixed parking area.

BACKGROUND OF THE INVENTION

Parking apparatuses of this type are known, fir example, from German patent DE 36 03 573 C2, which is incorporated by reference herein, German utility model DE 296 04 798 U1, which is incorporated by reference herein, German utility model DE 92 00 871 U1, which is incorporated by reference herein, and German utility model DE 86 03 017 U1, which is incorporated by reference herein. German laid-open application DE 10 2016 110 634 A1, which is incorporated by reference herein, discloses a folding table which is adjustable between a lowered position and a raised position, comprising a cover plate and a floor frame, a scissors mechanism arranged between the cover plate and the floor frame comprising at least two scissor member pairs each having two scissor members connected to each other via a common scissor member joint. U.S. Pat. No. 8,863,911 B2, which is incorporated by reference herein, discloses an apparatus for moving and fastening a component between an operating position, in which the component is fixedly connected to, a structure, and a non-operating position which is arranged below the operating position and in which the component is, removed from the structure. German laid-open application DE 10 2009 053 050 A1, which is incorporated by reference herein, discloses a device for removing a battery from a vehicle, wherein the battery is connected to the vehicle mechanically by means of at least one fastening element and electrically by means of a connecting element, and the battery changing apparatus comprises a lifting table, at least one actuator for the lifting table, at least one changing tool connected mechanically to the lifting table, a regulator for activating the at least one actuator, and at least one imaging device.

SUMMARY OF THE INVENTION

To simplify the charging of electrically operable motor vehicles, described herein is a parking apparatus having at least two parking areas, on each of which a motor vehicle can be parked, wherein the parking apparatus comprises at least one movable parking area which is movable relative to at least one fixed parking area, in that the parking apparatus is combined with a charging apparatus for charging electrical energy accumulators of electrically operable motor vehicles, wherein the charging apparatus is simultaneously connectable in terms of charging to electrically operable motor vehicles on both parking areas. The claimed parking apparatus constitutes a charging station having a lifting parking platform. With the parking apparatus, the use of the two parking areas for parking and charging electrically operated motor vehicles is considerably simplified. The parking apparatus can be particularly advantageously installed and operated even in the open air. Special structural measures, such as excavating a pit, are not required for producing the parking apparatus. Depending on the design, the parking apparatus may also serve as an individual garage which can be operated as a double parker for charging purposes.

A preferred exemplary embodiment of the parking apparatus is characterized in that the movable parking area is attached to at least two rods. The two rods are advantageously attached to one side of the movable parking area. A defined movement of the movable parking area can be realized in a simple manner with the two rods. In a particularly advantageous manner, two rods are attached to each side of the movable parking area. This affords the advantage of a very stable support without the space below the movable parking area being impaired by the rod.

A further preferred exemplary embodiment of the parking apparatus is characterized in that one of the rods is designed as a rigid articulated rod with a first end, which is coupled to a fixed bearing, and with a second end, which is coupled to the movable parking area. The rigid articulated rod is preferably coupled here to the fixed bearing and to the movable parking area in such a manner that a defined pivoting movement of the movable parking area relative to the floor structure is made possible.

A further preferred exemplary embodiment of the parking apparatus is characterized in that one of the rods is designed as a telescopic rod which is coupled at one end to the movable parking area. The end of the telescopic rod is advantageously coupled to the movable parking area in such a manner that the previously described defined pivoting movement of the movable parking area relative to the floor structure is made possible.

A further preferred exemplary embodiment of the parking apparatus is characterized in that one end of the telescopic rod is attached to a trolley which is movable in the vicinity of the floor. The trolley is advantageously movable in the vicinity of the floor in a floor region which is arranged adjacent to the fixed parking area, advantageously in front of or behind the latter. A particularly space-saving accommodating of the two parking areas is thereby made possible in a simple manner.

A further preferred exemplary embodiment of the parking apparatus is characterized in that the movable parking area is pivotable between a low position and a high position. In the low position, the movable parking area is advantageously arranged level with the fixed parking area. In the low position, a motor vehicle can be parked on the movable parking area. In the high position, the movable parking area is advantageously arranged in such a manner that the fixed parking area can be approached by a motor vehicle from at least two sides, preferably from the front and from the rear.

A further preferred exemplary embodiment of the parking apparatus is characterized in that the movable parking area in the low position is arranged in a forward direction in front of or behind the fixed parking area. For example, two motor vehicles can be parked simultaneously on the two parking areas. In the low position, the movable parking area can advantageously be driven over by a motor vehicle in order to reach the fixed parking area.

A further preferred exemplary embodiment of the parking apparatus is characterized in that the movable parking area in the high position is arranged above the fixed parking area. This affords the advantage that a motor vehicle when being electrically charged on the parking area which has been pivoted upward does not impair, or only insignificantly impairs, the approach to the fixed parking area.

A further preferred exemplary embodiment of the parking apparatus is characterized in that the charging apparatus comprises a charging point having at least two charging cables of a length sufficient in order to electrically charge electrically operable motor vehicles on the two parking areas. The simultaneous charging of two electrically operable motor vehicles is thereby made possible in a simple manner. Depending on the design, the charging apparatus may also be designed in such a manner that the charging operation can take place in a cable-free manner, i.e. without charging cables, and in particular contactlessly, for example by induction.

The above-stated object is also achieved by a method for charging electrical energy accumulators in motor vehicles at a charging station having a previously described parking apparatus. Two vehicles can advantageously be charged simultaneously at the charging station. If one motor vehicle is in the high position on the movable parking area, it is possible for the charging station to be approached virtually as desired. In order to realize the parking apparatus, use can be particularly advantageously made of parts which are simple to produce and are readily available, such as telescopic rods and articulated rods.

BRIEF DESCRIPTION OF THE DRAWINGS

Further advantages, features and details of the invention emerge from the description below in which various exemplary embodiments are described in detail with reference to the drawing, in which:

FIG. 2 shows the parking apparatus from FIG. 1 with a charging apparatus and with the movable parking area in a low position;

FIG. 3 shows the parking apparatus from FIG. 2, wherein, two charging cables of the charging apparatus are attached to two motor vehicles on the two parking areas;

FIG. 4 shows the parking apparatus from FIG. 3 with the two motor vehicles in the charging state, wherein the movable parking area with a first motor vehicle is arranged above the fixed parking area with a second motor vehicle; and FIG. 5 shows the parking apparatus from FIG. 4 after the end of a charging operation of the motor vehicle on the fixed parking area as said motor vehicle drives away.

DETAILED DESCRIPTION OF THE INVENTION

Figure 1:
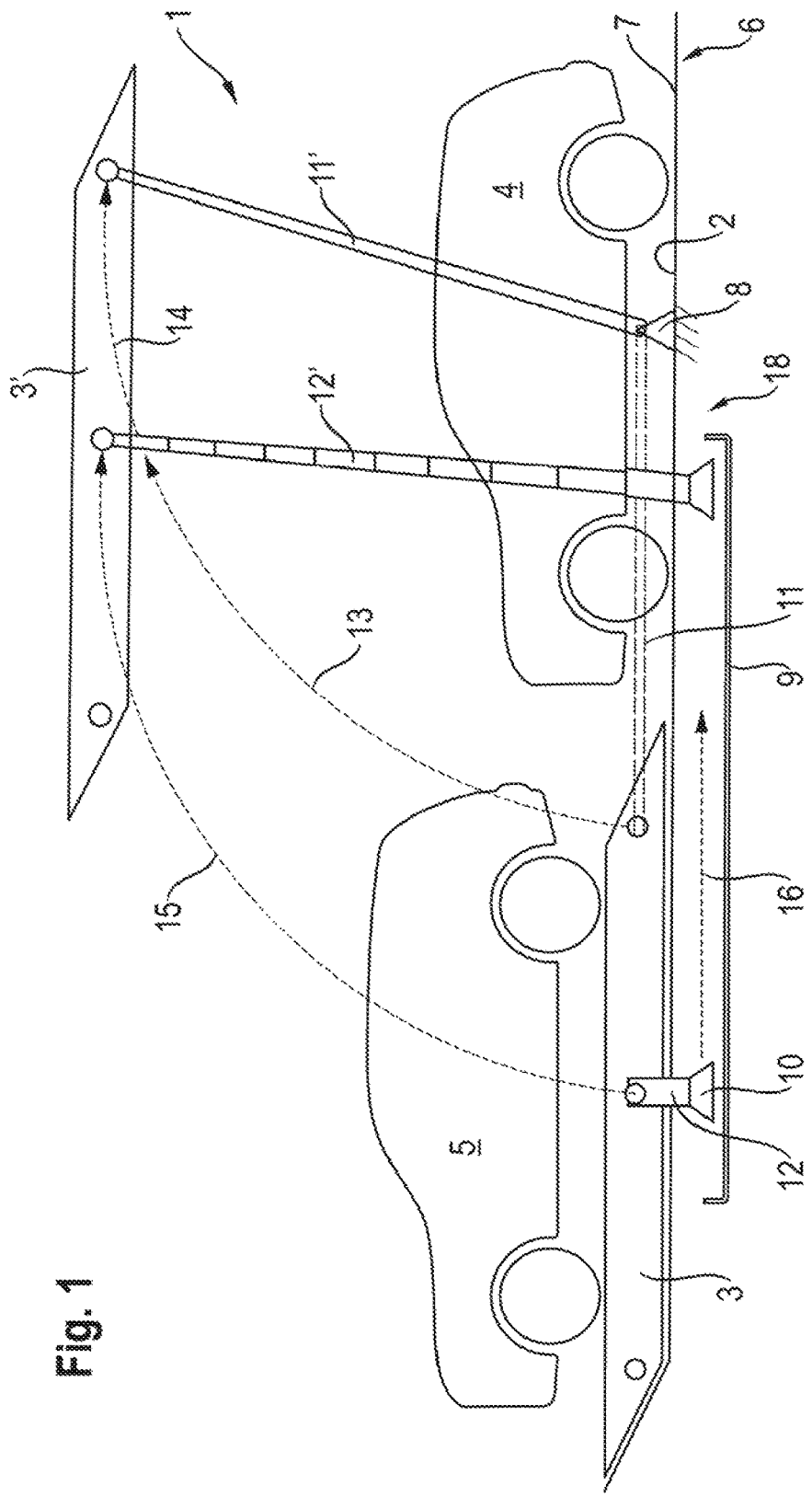
FIG. 1 shows a schematic illustration of a parking apparatus with a fixed parking area and a movable parking area which is attached pivotably to two rods.

FIGS. 1 to 5 illustrate a parking apparatus 1 with a fixed parking area 2 and a movable parking area 3 which is movable between a low position 3 and a high position 3'. Motor vehicles 4, 5 can be parked on the parking areas 2, 3.

The parking apparatus 1 comprises a floor 6 with a floor surface 7. The fixed parking area 2 is arranged on the floor surface 7. In its low position, the movable parking area 3 is likewise arranged on the floor surface 7.

Depending on the design of the movable parking area, the latter n its low position 3 can be arranged somewhat raised with respect to the floor surface 7. However, in its low position, the movable parking area 3 may also be arranged in a corresponding depression of the floor surface 7.

In its high position 3', the movable parking area, as seen in FIGS. 1, 4 and 5, is arranged above the fixed parking area 2. A height distance between the fixed parking area 2 and the movable parking area 3', in the high position thereof, is dimensioned in such a manner that motor vehicles 4, 5 can be maneuvered on the floor surface 7 with the fixed parking area 2 below the movable parking area 3' which is in its high position.

A fixed bearing 8 is anchored in the floor 6. Furthermore, the floor 6 is, provided with supporting structure 9 in the vicinity of the floor. The supporting structure 9 in the vicinity of the floor serves for the movable arrangement of a trolley 10. As indicated in FIG. 1 by a dashed arrow 16, the trolley 10 is movable to and fro in the horizontal direction, i.e., parallel to the floor surface 7, relative to the supporting structure 9 in the vicinity of the floor.

One end of a rigid articulated rod 11 is coupled to the fixed bearing 8. The rigid articulated rod 11 which is coupled to the fixed bearing 8 is pivotable between a low position 11 and a high position 11'. In its low position, the rigid articulated rod is denoted by 11. In its high position, the rigid articulated rod is denoted by 11'.

In FIGS. 1, 4 and 5, the rigid articulated rod is arranged in its high position 11'. The other end of the rigid articulated rod 11, 11' is coupled to the movable parking area 3.

One end of a telescopic rod 12, 12' is coupled to the trolley 10. The other end of the telescopic rod 12, 12' is coupled to the movable parking area 3; 3'. The telescopic rod in its retracted position is denoted by 12. In FIGS. 1, 2 and 3, the telescopic rod is in its retracted position 12 which can also be referred to as the low position. In FIGS. 1, 2 and 3, the trolley 10 is located in a left end region of the supporting structure 9 in the vicinity of the floor.

In FIGS. 1, 4 and 5, the telescopic rod in its extended position is denoted by 12'. In FIGS. 1, 4 and 5, the trolley 10 is arranged with the extended telescopic rod 12' in a right end region of the supporting structure 9 in the vicinity of the floor.

The pivoting movement of the rigid articulated rod 11, 11' with the movable parking area 3, 3' is indicated by dashed arrows 13 and 14 in FIG. 1. A movement of the upper end of the telescopic rod 12, 12' is indicated by an arrow 15 in FIG. 1. The movement 15 arises from a combination of the movement 16 to and fro of the trolley 10 and the extension movement of the telescopic rod 12, 12'.

The trolley 10 together with the rigid articulated rod 11, 11' and the telescopic rod 2, 12' constitutes a pivoting mechanism 18 for the movable parking area 3, 3'. By means of this pivoting mechanism 18, the movable parking area 3, 3' together with a motor vehicle 5 parked thereon can be moved from its low position 3 into its high position 3', as seen in FIG. 1.

It is seen in FIGS. 2 to 5 that the parking apparatus 1 is combined with a charging apparatus 20 for charging electrical energy accumulators of electrically operable motor vehicles 4, 5. The charging apparatus 20 comprises a charging point 25 having two charging cables 21, 22.

The charging apparatus 20 is arranged on the floor 6 to the right of the fixed parking area 2 in FIGS. 2 to 5. The fixed parking area 2 is arranged on the floor surface 7 in the horizontal direction between the charging apparatus 20 and the movable parking area 3, which is in its low position 3'.

In FIG. 2, an electrically operated motor vehicle 4 is parked on the fixed parking area 2. For this purpose, as indicated in FIG. 2 by a dashed contour of the motor vehicle 4, the movable parking area 3, which is in its low position, can be driven over. In FIG. 3, an electrically operated motor vehicle 5 is parked on the movable parking area 3 in the low position thereof. The charging cable 21 is connected to the motor vehicle 4. The charging cable 22 is connected to the motor vehicle 5. The motor vehicle 4 is arranged between the motor vehicle 5 and the charging point 25 in FIG. 3.

It is indicated in FIG. 4 that the motor vehicle 5 can be pivoted on the movable parking area 3' with the aid of the pivoting mechanism 18 in such a manner that the movable parking area 3' with the motor vehicle 5 is arranged above the fixed parking area 2 with the motor vehicle 4. The charging cables 21 and 22 do not need to be removed from the motor vehicles 4, 5 during the pivoting.

It is indicated in FIG. 4 by a dashed contour of the motor vehicle 4 that the motor vehicle 4 can leave the fixed parking area 2 when the charging operation at the motor vehicle 4 is finished.

In FIG. 5, the motor vehicle 4 is illustrated as it leaves the parking apparatus 1. It is indicated by a dashed contour of the motor vehicle 4 on the fixed parking area 2 that, after the end of the charging operation, the motor vehicle 4 can simply be driven out below the movable parking area 3' in the high position.

What is claimed is:

1. A parking apparatus having at least two parking areas, on each of which a motor vehicle can be parked, wherein the parking apparatus comprises:
   at least one movable parking area of the at least two parking areas which is movable between two different parking positions relative to at least one fixed parking area of the at least two parking areas, and
   a charging apparatus for charging electrical energy accumulators of electrically operable motor vehicles,
   wherein the charging apparatus is simultaneously connectable to both a first electrically operable motor vehicle positioned on the at least one fixed parking area and a second electrically operable motor vehicle positioned on the at least one movable parking area for charging the first and second electrically operable motor vehicles,
   wherein in a first parking position of the two different parking positions, the at least one movable parking area and the second electrically operable motor vehicle are positioned above the at least one fixed parking area and the first electrically operable motor vehicle that is positioned in the at least one fixed parking area, and, in a second parking position of the two different parking positions, the at least one movable parking area and the second electrically operable motor vehicle are positioned in front of the at least one fixed parking area and the first electrically operable motor vehicle that is positioned in the at least one fixed parking area as viewed in a forward/reverse travel direction of the vehicles,
   wherein a charging cable of the charging apparatus is configured to be connected to the second electrically operable motor vehicle parked on the movable parking area, and the charging cable is configured to remain connected to the second electrically operable motor vehicle on the movable parking area while the movable parking area is moved between the two different parking positions,
   wherein the movable parking area is attached to at least two rods, and one of the rods is a telescopic rod which is coupled at one end to the at least one movable parking area, and
   wherein one end of the telescopic rod is attached to a trolley which is translatably mounted in the vicinity of a floor, and the trolley translates with respect to the charging apparatus while the at least one movable parking area is moved between the two different parking positions.

2. The parking apparatus as claimed in claim 1, wherein one of the rods is a rigid articulated rod having a first end that is coupled to a fixed bearing and a second end that is coupled to the movable parking area.

3. The parking apparatus as claimed in claim 1, wherein the movable parking area is pivotable between a low position and a high position.

4. The parking apparatus as claimed in claim 3, wherein the movable parking area in the low position is arranged in a forward direction and either in front of or behind the fixed parking area.

5. The parking apparatus as claimed in claim 3, wherein the movable parking area in the high position is arranged above the fixed parking area.

6. The parking apparatus as claimed in claim 1, wherein the charging apparatus comprises a charging point having at least two charging cables of a length sufficient to electrically charge the electrically operable motor vehicles on the parking areas.

7. The parking apparatus as claimed in claim 1, wherein the charging apparatus is simultaneously connectable to the electrically operable motor vehicles on both of the at least two parking areas for charging the electrically operable motor vehicles while the at least one moveable parking area is moved between the two different parking positions.

8. In a charging station having a parking apparatus including (i) at least one fixed parking area on which a first electrically operable motor vehicle can be parked, (ii) at least one movable parking area which is movable relative to the at least one fixed parking area and on which a second electrically operable motor vehicle can be parked, wherein the at least one movable parking area is attached to at least two rods, and one of the rods is a telescopic rod which is coupled at one end to the at least one movable parking area, and one end of the telescopic rod is attached to a trolley which is translatably mounted in the vicinity of a floor, and (iii) a charging apparatus including a charging cable for charging electrical energy accumulators of the first and second electrically operable motor vehicles, a method for charging electrical energy accumulators in motor vehicles comprises:
   moving the at least one moveable parking area between two different parking positions by translating the trolley with respect to the charging apparatus and either extending or retracting the telescopic rod, wherein in a first parking position of the two different parking positions, the at least one movable parking area and the second electrically operable motor vehicle are positioned above the at least one fixed parking area and the first electrically operable motor vehicle, and, in a second parking position of the two different parking positions, the at least one movable parking area and the second electrically operable motor vehicle are positioned in front of the at least one fixed parking area and the first electrically operable motor vehicle as viewed in a forward/reverse travel direction of the vehicles; and
   simultaneously charging the first and second electrically operable motor vehicles using the charging apparatus during the moving step while the charging cable remains connected to the second electrically operable motor vehicle on the at least one movable parking area.

* * * * *